(12) United States Patent
Kurup

(10) Patent No.: US 10,751,702 B2
(45) Date of Patent: Aug. 25, 2020

(54) PHOTOCATALYTIC COMPOSITION FOR WATER PURIFICATION

(71) Applicant: Deepika Saraswathy Kurup, Lexington, MA (US)

(72) Inventor: Deepika Saraswathy Kurup, Lexington, MA (US)

(*) Notice: Subject to any disclaimer, the term of this patent is extended or adjusted under 35 U.S.C. 154(b) by 92 days.

(21) Appl. No.: 16/194,843

(22) Filed: Nov. 19, 2018

(65) Prior Publication Data
US 2019/0151828 A1    May 23, 2019

Related U.S. Application Data

(60) Division of application No. 15/010,174, filed on Jan. 29, 2016, now Pat. No. 10,183,277, which is a
(Continued)

(51) Int. Cl.
*B01J 23/50* (2006.01)
*C02F 1/32* (2006.01)
(Continued)

(52) U.S. Cl.
CPC ............ *B01J 23/50* (2013.01); *B01J 23/02* (2013.01); *B01J 23/06* (2013.01); *B01J 35/002* (2013.01);
(Continued)

(58) Field of Classification Search
USPC ........................................ 210/748
See application file for complete search history.

(56) References Cited

U.S. PATENT DOCUMENTS 5,194,161 A    3/1993   Heller et al.
5,275,741 A *  1/1994   Miano ................... A61L 2/10
                                                       210/748.14
(Continued)

FOREIGN PATENT DOCUMENTS

EP    0812619 A1    12/1997
EP    0923988 A1    6/1999
JP    2002253973 A    9/2002

OTHER PUBLICATIONS

U.S. Appl. No. 14/144,540, Abandoned.
(Continued)

*Primary Examiner* — Nina Bhat
(74) *Attorney, Agent, or Firm* — Janine S. Ladislaw; Foley Hoag LLP

(57) ABSTRACT

The present invention refers to lightweight and settable photocatalytic compositions and solid composites; methods of preparing the compositions and solid composites; and their use in water purification. The compositions are comprised of photocatalysts such as titanium dioxide ($TiO_2$) and zinc oxide (ZnO), lightweight glass bubbles, and a hydraulic cementing binder. The lightweight and settable photocatalytic compositions can be formed into lightweight photocatalytic solid composites and/or structures by mixing with water and moist curing. This invention also describes relatively simple, fast, and cost effective methodologies to photodope the $TiO_2$—ZnO compositions and composites with silver (Ag), to enhance and extend the photocatalytic activity from the ultraviolet into the visible light spectrum. The lightweight and settable $TiO_2$—ZnO and Ag—$TiO_2$—ZnO compositions are used in making solids, structures, coatings, and continuous or semi-continuous water purification panels for purifying contaminated water.

9 Claims, 14 Drawing Sheets

Related U.S. Application Data continuation of application No. 14/144,540, filed on Dec. 30, 2013, now abandoned.

(60) Provisional application No. 61/747,629, filed on Dec. 31, 2012.

(51) Int. Cl.

| | | |
|---|---|---|
| *B01J 35/00* | (2006.01) | |
| *B01J 35/08* | (2006.01) | |
| *B01J 37/02* | (2006.01) | |
| *C02F 1/72* | (2006.01) | |
| *B01J 23/02* | (2006.01) | |
| *B01J 23/06* | (2006.01) | |
| *B01J 37/00* | (2006.01) | |
| *B01J 37/04* | (2006.01) | |
| *B01J 37/08* | (2006.01) | |
| *B01J 37/34* | (2006.01) | |
| *C02F 1/30* | (2006.01) | |

(52) U.S. Cl.
CPC ............. *B01J 35/004* (2013.01); *B01J 35/08* (2013.01); *B01J 37/0009* (2013.01); *B01J 37/0217* (2013.01); *B01J 37/04* (2013.01); *B01J 37/088* (2013.01); *B01J 37/344* (2013.01); *C02F 1/30* (2013.01); *C02F 1/32* (2013.01); *C02F 1/725* (2013.01); *B01J 2523/00* (2013.01); *C02F 2303/04* (2013.01); *C02F 2305/10* (2013.01); *C02F 2307/02* (2013.01); *Y02W 10/37* (2015.05)

(56) References Cited

U.S. PATENT DOCUMENTS

| | | | |
|---|---|---|---|
| 5,547,823 | A | 8/1996 | Murasawa et al. |
| 5,616,532 | A | 4/1997 | Heller et al. |
| 5,849,200 | A | 12/1998 | Heller et al. |
| 5,897,958 | A | 4/1999 | Yamada et al. |
| 6,046,255 | A | 4/2000 | Gray et al. |
| 6,562,461 | B1 * | 5/2003 | Clough ................ B01J 37/349 427/215 |
| 7,211,543 | B2 | 5/2007 | Nakabayash et al. |
| 7,556,683 | B2 * | 7/2009 | Bonafous ............... B01J 35/004 106/712 |
| 8,349,764 | B2 | 1/2013 | Burba, III |
| 8,535,803 | B2 | 9/2013 | Shiao et al. |
| 1,018,327 | A1 | 1/2019 | Kurup |
| 10,183,277 | B2 * | 1/2019 | Kurup ..................... C02F 1/30 |
| 10,195,602 | B2 * | 2/2019 | Dadheech ............... B01J 21/04 |
| 2004/0127354 | A1 | 7/2004 | Andrews |
| 2007/0259991 | A1 | 11/2007 | Ihara et al. |
| 2010/0137130 | A1 * | 6/2010 | Book .................... C09D 5/1687 502/218 |
| 2013/0034697 | A1 | 2/2013 | Shiao et al. |

OTHER PUBLICATIONS

U.S. Appl. No. 15/010,174, Granted.
Akpan et al., "The Advancements in Sol-Gel Method of Doped-TiO2 Photocatalysts," Appl Catal A-Gen, 375: 1-11 (2010).
Asadi et al., "Development of Photocatalytic Pervious Concrete Pavement for Air and Storm Water Improvements," Transportation Research Record: Journal of the Transportation Research Board, 2290: 161-167 (2012).
Barnes et al., "Comparison of TiO2 and ZnO Nanoparticles for Photocatalytic Degradation of Methylene Blue and the Correlated Inactivation of Gram-Positive and Gram-Negative Bacteria," J Nanopart Res, 15: 1432-1439 (2013).
Byrne et al., "Photocatalytic Enhancement for Solar Disinfection of Water: A Review," Int J Photoenergy, 2011: 1-12 (2011).
Feng et al., "A Mechanistic Study of the Antibacterial Effect of Silver Ions on *Escherichia coli* and *Staphylococcus aureus*," John Wiley & Sons, Inc., 662-668 (2000).
Guin et al., "Photoreduction of Silver on Bare and Colloidal TiO2 Nanoparticles/Nanotubes: Synthesis, Characterization, and Tested for Antibacterial Outcome," J Phys Chem C, 111 (36): 13393-13397 (2007).
Gupta et al., "Photocatalytic Antibacterial Performance of TiO2 and Ag-doped TiO2 against *S. aureus. P. aeruginosa* and *E. coli*," Beilstein Journal of Nanotechnology, 4: 345-351 (2013).
Hamal et al., "Synthesis, Characterization, and Visible Light Activity of New Nanoparticle Photocatalysts Based on Silver, Carbon, and Sulfur-doped TiO2," J Colloid Intert Sci, 311: 514-522 (2007).
Harris, A. Deepika Kurup Named 'America's Top Young Scientist' in 2012 Discovery Education 3M Young Scientist Challenge [press release]. Oct. 17, 2012 [retrieved online on Jan. 25, 2017]. Retrieved from the Internet: < https://corporate.discovery.com/blog/2012/10/17/deepika-kurup-named-americas-top-young-scientist-in-2012-discovery-education-3m-young-scientist-challenge/>.
Hashimoto et al., "TiO2 Photocatalysis: A Historical Overview and Future Prospects," Jpn J Appl Phys, 44(12): 8269-8285 (2005).
Houas et al., "Photocatalytic Degradation Pathway of Methylene Blue in Water," Appl Catal B-Environ, 31: 145-157 (2001).
Human English Translation of Photocatalytic Body, Method of Manufacture Therefor, and Application Thereof, JP-2002-253973 date Sep. 10, 2002, Translated by: Schreiber Translations, Inc. for the USPTO.
Kim et al., "Antibacterial Activity of Silver-nanoparticles Against *Staphylococcus aureus* and *Escherichia coli*," Korean Journal of Microbiology and Biotechnology, 39(1): 77-85 (2011).
Kurup, Deepika. 14-Year-old is America's Top Young Scientist: Her Solar Powered Jug Purifies Water [online]. Oct. 22, 2012 [retrieved online on Jan. 25, 2017]. Retrieved from the Internet: < https://www.youtube.com/watch?v=71c95-LoBok>.
Liu et al., "Synthesis and Photoactivity of the Highly Efficient Ag Species/TiO2 Nanoflakes Photocatalysts," J Alloy Compd, 209: 5152-5158 (2011).
Machine Translation of JP 2002-253973, abstract, detailed description and claims.
Nadtochenko et al., "Dynamics of *E.coli* Membrane Cell Peroxidation During TiO2 Photocatalysis Studied by ATR-FTIR Spectroscopy and AFM Microscopy," J Photoch Photobio A, 169: 131-137 (2005).
Ragai et al., "Synergistic Effect Between TiO2, Zirconium and Carbon in the Photodegradation of Methyl Orange and Methylene Blue," Adsorpt Sci Technol, 31 (2+3): 213-221 (2013).
Shaban et al., "Enhanced Photocatalytic Removal of Methylene Blue from Seawater Under Natural Sunlight Using Carbon-Modified n-TiO2 Nanoparticles," Environment and Pollution, 3(1): 41-50 (2014).
Smith et al., "The Effect of Ag Nanoparticle Loading on the Photocatalytic Activity of TiO2 Nanorod Arrays," Chem Phys Lett, 485: 171-175 (2010).
Sunada et al., "Studies on Photokilling of Bacteria on TiO2 Thin Film," J Photoch Photobio A, 156: 227-233 (2003).

\* cited by examiner

PHOTOCATALYTIC COMPOSITION FOR WATER PURIFICATION

CROSS-REFERENCE TO RELATED APPLICATIONS

This application claims the benefit of U.S. Provisional Patent Application No. 61/747,629, filed Dec. 31, 2012.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO SEQUENCE LISTING, A TABLE, OR A COMPUTER PROGRAM LISTING COMPACT DISC APPENDIX

Not Applicable

TECHNICAL FIELD

The present invention is in the field of photocatalysis. More particularly, the present invention is in the technical field of photocatalytic compositions, composites, and methods for water purification.

BACKGROUND OF THE INVENTION

Clean and safe water is an indispensable resource essential for the survival of all species. Although 70% of the Earth is covered by water, only 2.5% of this is freshwater. Most of that water is unattainable, which leaves less than 1% of the Earth's freshwater for human consumption. According to the World Health Organization, one-sixth of the global population lacks access to clean drinking water. It would greatly benefit society, and save millions of lives, if we had safe, affordable, sustainable and easily deployable water purification techniques. Drinking water contamination can come from harmful microbiological pathogens, organic chemicals and heavy metals. Current water purification techniques include filtration, chemical means such as chlorination, ozonation, aeration, reverse osmosis, and ultraviolet (UV) radiation using UV-C lamps (operating at wavelength in the range 100-280 nm). Some of the above mentioned water purification techniques use lamps and require electricity to operate, some use slow physical separation processes, and others use chemicals that generate compounds leading to secondary pollution and even leave water with a bad smell and after taste. There is a pressing need for green, sustainable, easy to use, inexpensive and effective technologies for water purification.

Ultraviolet radiation from the sun (UV-A, wavelength of 315-400 nm) is a safe and cost-effective means to purify water infected by microbiological pathogens such as bacteria. When UV strikes the deoxyribonucleic acid (DNA) of bacteria, pyrimidine dimers or bonds are formed between adjacent thymine or cytosine base pairs. This inactivates the bacteria by preventing its DNA from replicating. Since the more harmful UV-B and UV-C radiation from the sun are blocked by the atmosphere, solar disinfection, commonly referred to as SODIS, that primarily uses UV-A radiation is very slow. In recent years photocatalysts such as $TiO_2$ and ZnO, have been used to accelerate the photocatalytic SODIS process.

A photocatalyst is a substance, that when activated by light radiation (UV-A radiation and/or visible light, in the present invention), increases the rate of a reaction, without itself being consumed in the reaction. Anatase crystalline $TiO_2$ and ZnO are photocatalysts that are activated by UV-A radiation from the sun. When UV-A radiation strikes these photocatalysts, electrons from the valence band are energized into the conduction band ($e^-$) thereby leaving holes or positive charges ($h^+$) in the valence band. Some of the electrons and holes may recombine, but most combine with oxygen and water to create reactive oxygen species such as super oxides ($O_2$), hydroxyl radicals (.OH) and hydrogen peroxide ($H_2O_2$). These reactive species are responsible for the photo-killing of bacteria, reduction of heavy metals, and oxidation (and degradation) of organics into harmless species. The highly reactive oxygen species destroy pathogens by damaging cellular membranes, lipids, proteins and mitochondria. They also disrupt their DNA, alter their structure and prevent them from replicating.

One of the problems associated with the use of $TiO_2$ for water purification, is the difficulty in recovering the $TiO_2$ nanoparticles by filtration from the TiO2-water slurry, after the disinfection process. The slurry also impedes the transmission of UV, especially since $TiO_2$ and ZnO are typically used in sunscreens to block UV radiation from the sun. In one of the field applications that use $TiO_2$ assisted SODIS, $TiO_2$ is mixed with perchloric acid and coated in the inner surface of plastic Polyethylene terephthalate (PET) water bottles. The bottles are filled with contaminated water and exposed to the sun, to be purified by photocatalysis. The primary drawback of this method is that the non-uniform $TiO_2$ coatings block UV radiation which diminishes photocatalytic activity. Another drawback of this method is that the $TiO_2$ coatings often wash-off after repeated use. Yet another limitation of the existing $TiO_2$ enhanced SODIS method is its reduced efficiency when UV index is very low, since it uses UV-A radiation which comprises only 3% of the solar energy.

DESCRIPTION OF THE PRIOR ART

U.S. Pat. No. 7,556,683 describes a photocatalytic granular mixture for mortar and concrete and their use in the fields of construction or renovation of buildings, or roadway coatings for imparting properties for self-cleaning, reduction of odors, and depollution of ambient air. The photocatalytic granular mixture of titanium oxide particles comprises titanium oxide particles of n granular classes having different specific surface areas, n being a number greater than or equal to 2. The photocatalytic granular mixture can be in the form of a powder or in the form of an aqueous solution containing a dispersing agent, compatible with the cement, concrete and mortar media.

US2010/0137130 describes a composition that is photocatalytically active and comprises coating carrier material particles with photocatalytically active particles. The composition is prepared using high energy mixing and the coating is performed in the presence of a hydraulic medium. The photocatalytically active composition has low dusting characteristics and good flow ability and is suitable for use in concrete or mortar mixes for preparing structures and materials for maintaining a clean surface.

EP0923988B1 discloses a photocatalyst-carrying structure comprising a photocatalyst layer, held by an adhesive layer to a substrate, wherein the adhesive layer is composed of silicon-modified resin, polysiloxane-containing resin or colloidal silica-containing resin. Materials such as glass, plastics, metals, fabrics, and wood materials, carrying the photocatalyst-carrying structure with a photocatalyst is resistant to deterioration and is highly durable.

U.S. Pat. No. 7,211,543 describes a photocatalyst composition which comprises modified photocatalyst particles and a binder component comprising a phenyl group-containing silicone and optionally an alkyl group. The photocatalyst particles are prepared by subjecting particles of a photocatalyst to a modification treatment comprising at least one modifier compound selected from the group consisting of different compounds consisting of a triorganosilane unit, a monooxydiorganosilane unit and a dioxyorganosilane unit. The invention also describes a film formed using the photocatalyst composition and a shaped article produced by shaping the photocatalyst composition.

EP0812619 discloses a photocatalytic homogeneous gel composition transparent to visible and/or solar radiation, comprising titanium dioxide and cerium oxide photocatalysts, dispersed in an aluminosilicate inorganic polymer binder of the Imogolite type. The composition may be coated on a photocatalytic element such as an organic or glass polymer support. The patent also provides a method to destroy organics in an aqueous solution by making the solution to flow over the photocatalytic element.

U.S. Pat. No. 5,547,823 describes a process for making photocatalyst composite comprising photocatalyst such as $TiO_2$, adhered to a substrate by a less degradative adhesive such as fluorinated polymer. The composite may be used for removal of deleterious and malodorous materials, bacteria, fungi, algae and the like. This patent also discloses a coating composition comprising a dispersion of photocatalyst and adhesive in a solvent.

U.S. Pat. No. 5,275,741 describes a method for the photocatalytic treatment of aqueous mixtures of polluting substances by radiations from a lamp emitting radiations with a wavelength shorter than 400 nm. The method comprises irradiating the polluted aqueous mixtures in the presence of titanium dioxide, while the mixtures are circulating inside a reactor.

SUMMARY OF THE INVENTION

The first aspect of this invention includes simple, fast, and cost effective methodologies to synthesize a lightweight and settable photocatalytic composition comprising photocatalysts, glass bubbles, and a settable hydraulic cementing binder. The invention also includes a method for photodoping this composition in order to extend the photocatalytic activity. The invention further includes a method for preparing a lightweight photocatalytic solid composite as well as a photodoped lightweight solid composite and the use of these compositions and composites in water purification.

The lightweight and settable photocatalytic composition may include a single photocatalyst or a combination of photocatalysts, such as $TiO_2$ and $ZnO$, that when subjected to UV light, results in electron transition from the valence band to the conduction band of the material, thereby leaving hole in the valence band. The method for preparing the lightweight and settable photocatalytic composition involves first proportioning, mixing and blending the photocatalysts in a predetermined ratio, such as a ratio of $ZnO:TiO_2$ of 1:4. Then pre-determined amounts of lightweight glass bubbles and hydraulic cementing binder are added in stages and mixed by mechanical means. Several proportions by weight of $ZnO:TiO_2$:glass bubbles:cementing binder, such as 1:4:25:100, can be used in the composition as long as the compositions retain their photocatalytic properties.

The photocatalysts in the lightweight and settable composition may further be doped with nonmetals or metals in order to extend the photocatalytic activity from the ultraviolet into the visible light spectrum. The method for photodoping the photocatalytic composition with dopants such as Ag involves first mixing or coating the photocatalysts and/or photocatalytic composition with a metal salt solution, such as 0.1M silver nitrate ($AgNO_3$), and exposing it to the sun. Then the photodoped photocatalysts and/or photocatalytic composition is calcined at temperatures between 200° C. and 500° C. for a period of 1 to 3 hours.

The lightweight and settable photocatalytic compositions can be formed into lightweight photocatalytic solid composites and/or structures by mixing with water and moist curing. The surface of the lightweight solid composites may be photodoped with a metal salt, such as Ag, as described previously. The lightweight $TiO_2$—$ZnO$ and Ag—$TiO_2$—$ZnO$ photocatalytic solid composites may be cast into any form that can be placed in contact with water and exposed to sunlight or artificial light, until the contaminated water is purified by photocatalysis. Photocatalytic spheres and cylinders that can be placed in water vessels, a water tank, and a continuous or semi-continuous water purification panel, were developed for easy deployment of the invention, without blocking light and without washing-off.

Figure 11A:
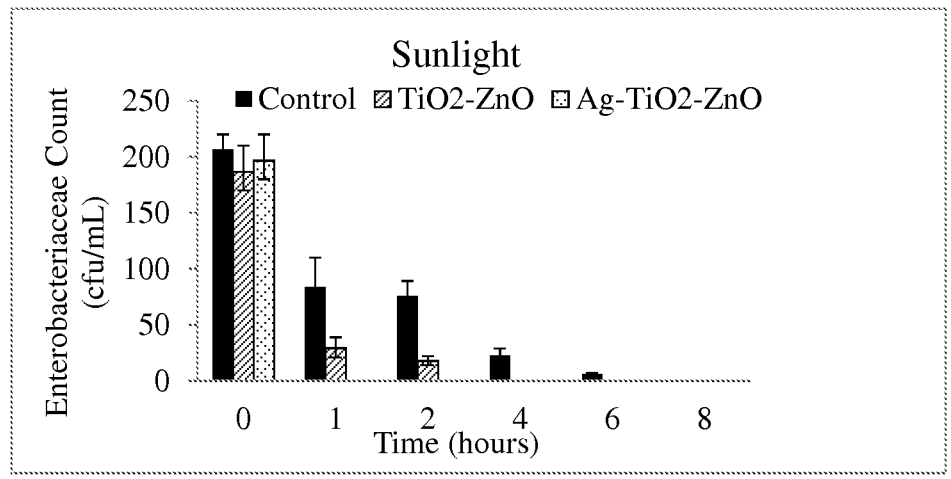
FIGS. 11A, 11B, and 11C show a graphical illustration of the average number of Enterobacteriacea counts at various time intervals for the control, $TiO_2$—$ZnO$ and Ag—$TiO_2$—
Figure 11B:
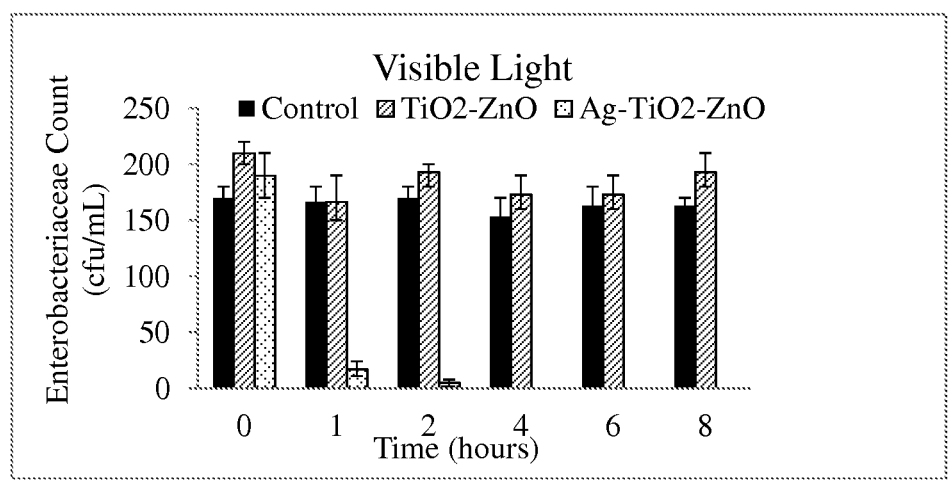
Figure 11C:
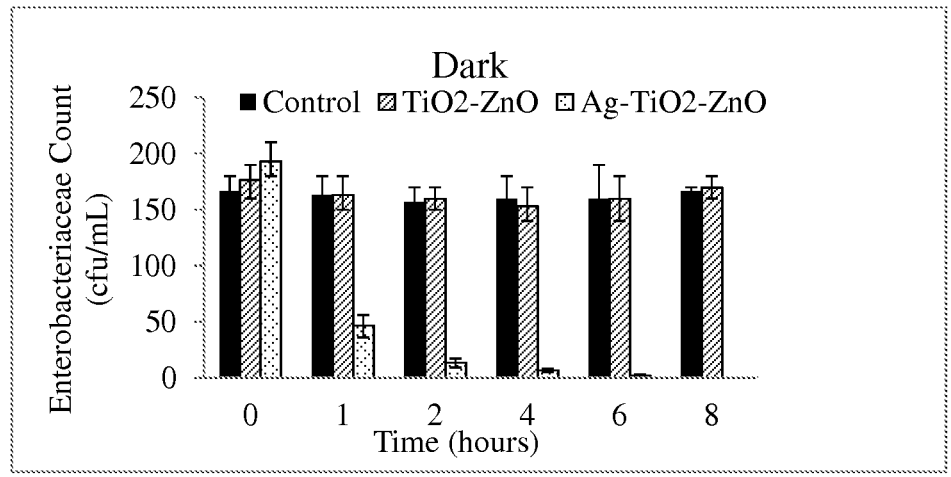

ZnO solid composites exposed to sunlight (FIG. 11A), visible light (FIG. 11B), and in the dark (FIG. 11C).

Figure 12A:
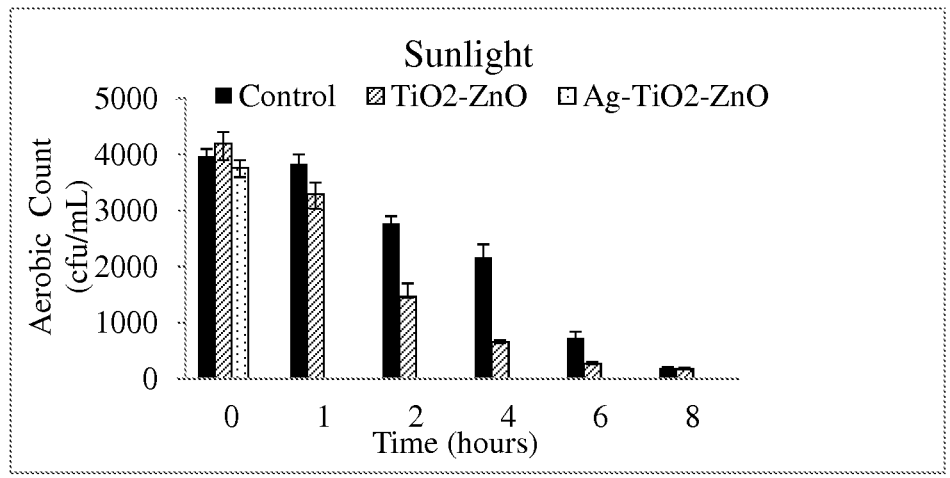
Figure 12B:
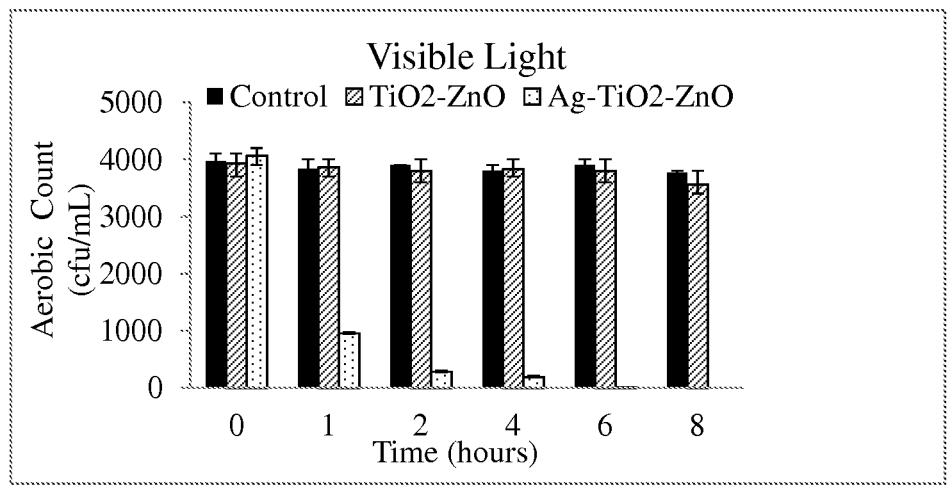
Figure 12C:
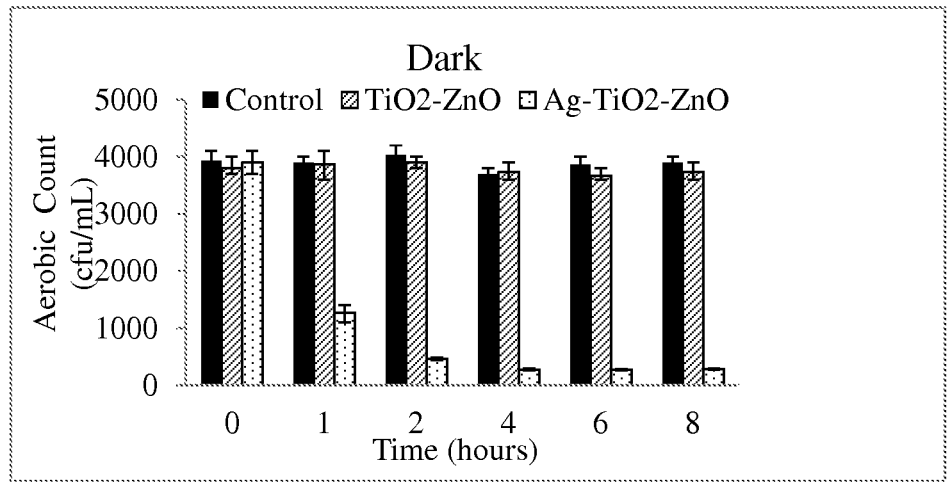

FIGS. 12A, 12B, and 12C show a graphical illustration of the average number of aerobic bacteria counts at various time intervals for the control, $TiO_2$—ZnO and Ag—$TiO_2$—ZnO solid composites exposed to sunlight (FIG. 12A), visible light (FIG. 12B), and in the dark (FIG. 12C).

Figure 13:
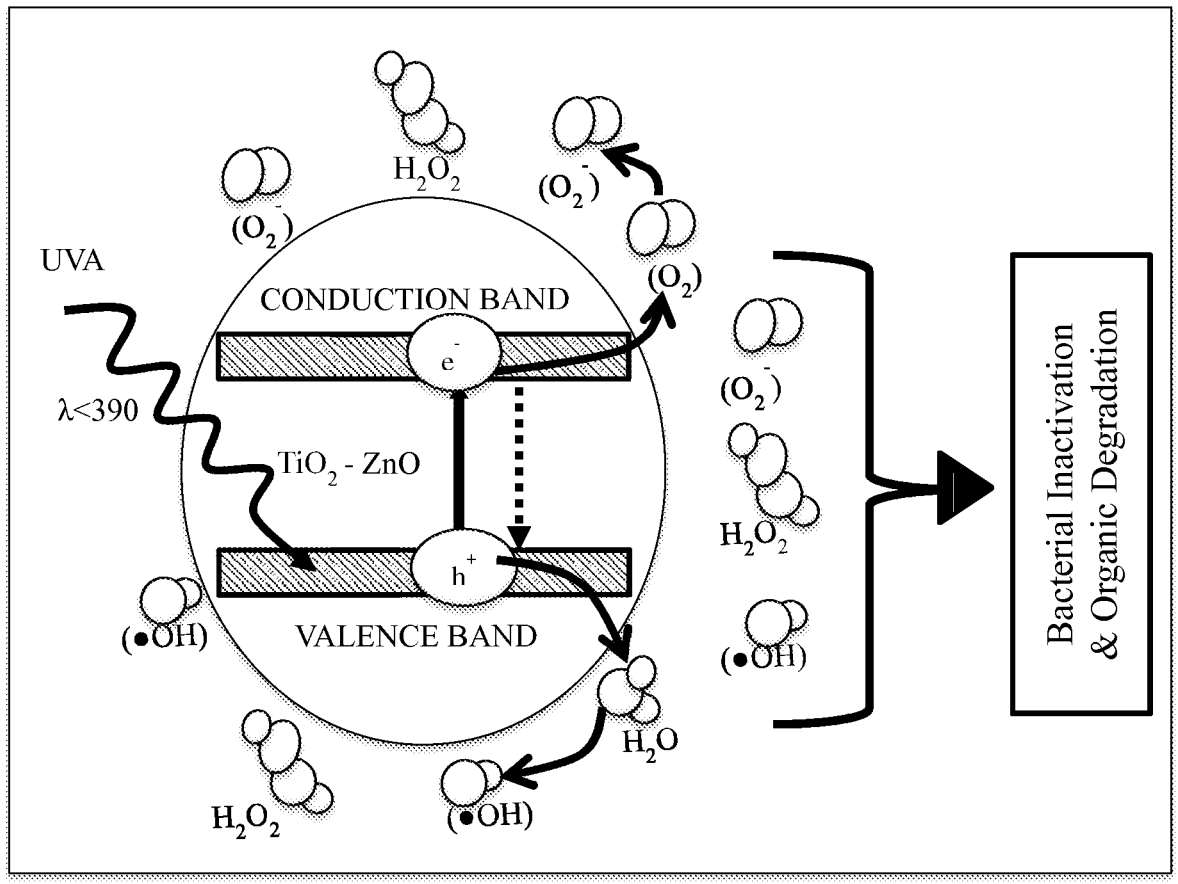

FIG. 13 illustrates the mechanism of forming reactive oxygen species as a result of UV-A activated photocatalysis of the $TiO_2$—ZnO composite.

Figure 14:
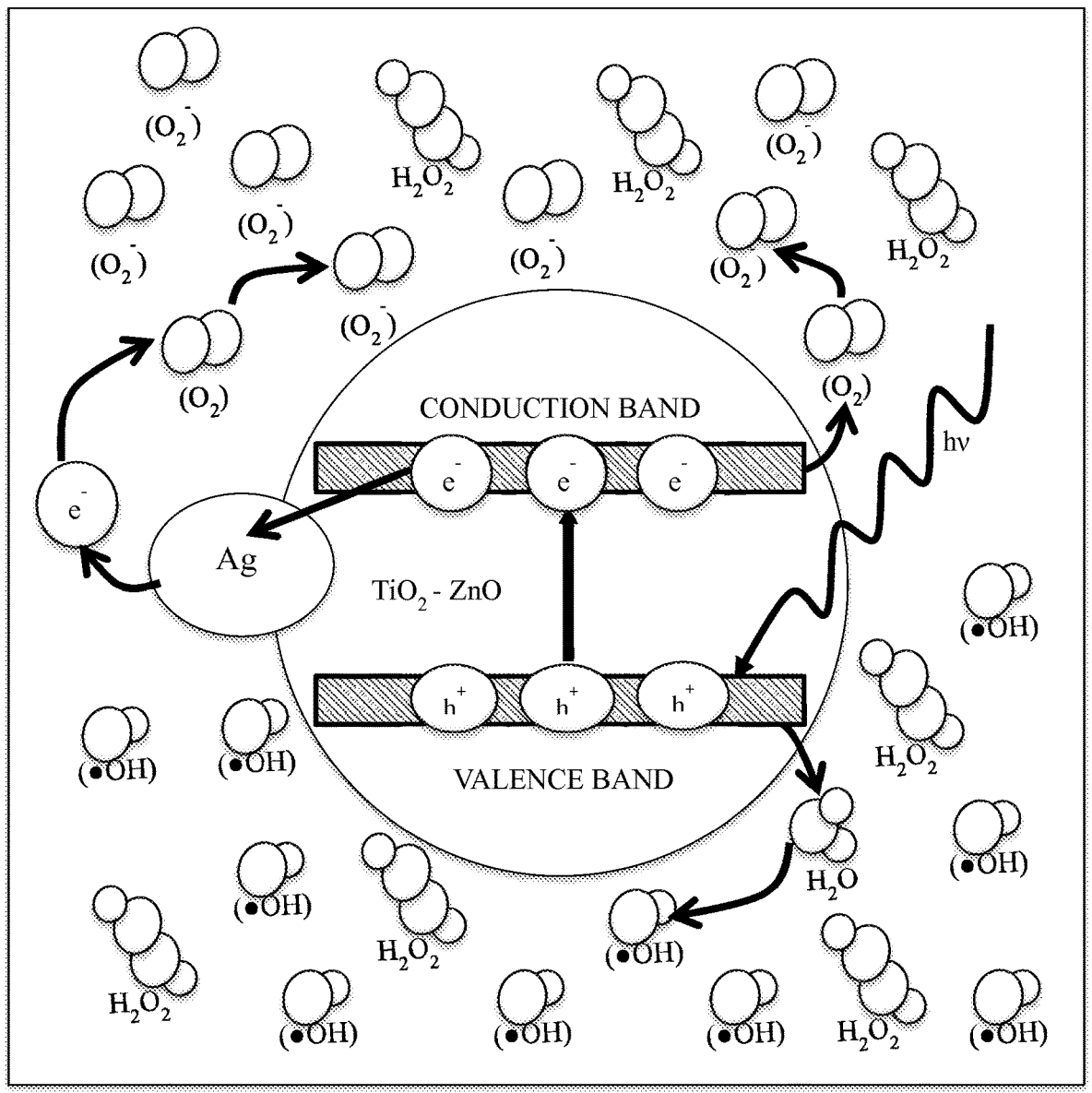

FIG. 14 illustrates the enhanced photocatalytic activity of the Ag—$TiO_2$—ZnO composite and the formation of a greater number of reactive oxygen species as a result of the synergistic effects of UV-Vis photocatalysis.

DETAILED DESCRIPTION OF THE INVENTION

As we strive for a green and environmentally-friendly world, conventional techniques for water purification must move towards green and sustainable alternatives. Realizing this need for eco-friendly, sustainable, cost-effective, and efficient water purification systems, the inventor has developed lightweight and settable photocatalytic compositions, comprised of photocatalysts, hollow glass bubbles, and a hydraulic cementing binder. The inventor has also developed methods to deploy and use the lightweight and settable photocatalytic composition in systems for purifying water.

The photocatalyst used in the lightweight and settable composition may be either a single photocatalyst or combination of photocatalysts, which are selected from materials such as $TiO_2$, ZnO, $WO_3$, $Cu_2O$, $SnO_2$, $SiO_2$, $RuO_2$, $SrTiO_3$, $Fe_2O_3$, NiO, SiC, and the like, that when subjected to light, results in transition of electrons from the valence band to the conduction band of the material, thereby leaving holes in the valence band. These electrons and holes participate in advanced oxidation and reduction reactions. The photocatalysts used in the lightweight and settable composition may also include non-metals and metals such as N, C, S, P, B, F, I, Cu, Ag, Pt, Pd, Mn, Wo, Ni, Sn, Fe, V and the like, or their oxides as dopants, to enhance and extend its photocatalytic activity from the ultraviolet into the visible light spectrum.

The glass bubbles used in the present invention include all types of commercially available glass bubbles or hollow glass microspheres that are typically made of sodium silicate, aluminosilicate, or borosilicate materials. The glass bubbles are transparent to UV and visible light and have sizes ranging from 100 nanometers to 5 millimeters in diameter. The glass bubbles used in the lightweight and settable photocatalytic composition of the present invention had median particle size ranging from 15 microns to 70 microns. Glass bubbles of any other size range may also be used. The glass bubbles are hollow and light weight, with densities ranging from 0.1 to 0.7 g/cc. Hence, by increasing or decreasing the amount of glass bubbles in the composition, they are useful in creating solid photocatalytic composites that can be made to float or sink in water. The inclusion of glass bubbles in the photocatalytic composition also increases the flow of the dry photocatalytic composition and also increases the workability of the mixture as water is added to the photocatalytic composition in order to prepare solid composites. This increase in workability as measured by the slump test (as described in ASTM C143/C143M) assists in easy placement, compaction, and coating.

The settable hydraulic cementing binder in the lightweight and settable photocatalytic composition commonly comprises of all types of Portland cements, blended hydraulic cements, performance based hydraulic cements, special cements, and combinations thereof. When water is added to the cement, it chemically reacts with the hydraulic binding material in a reaction known as hydration, and results in a paste that sets and hardens with time. This property allows cement to be used as a binding material in the manufacture or production of concrete.

Figure 1:
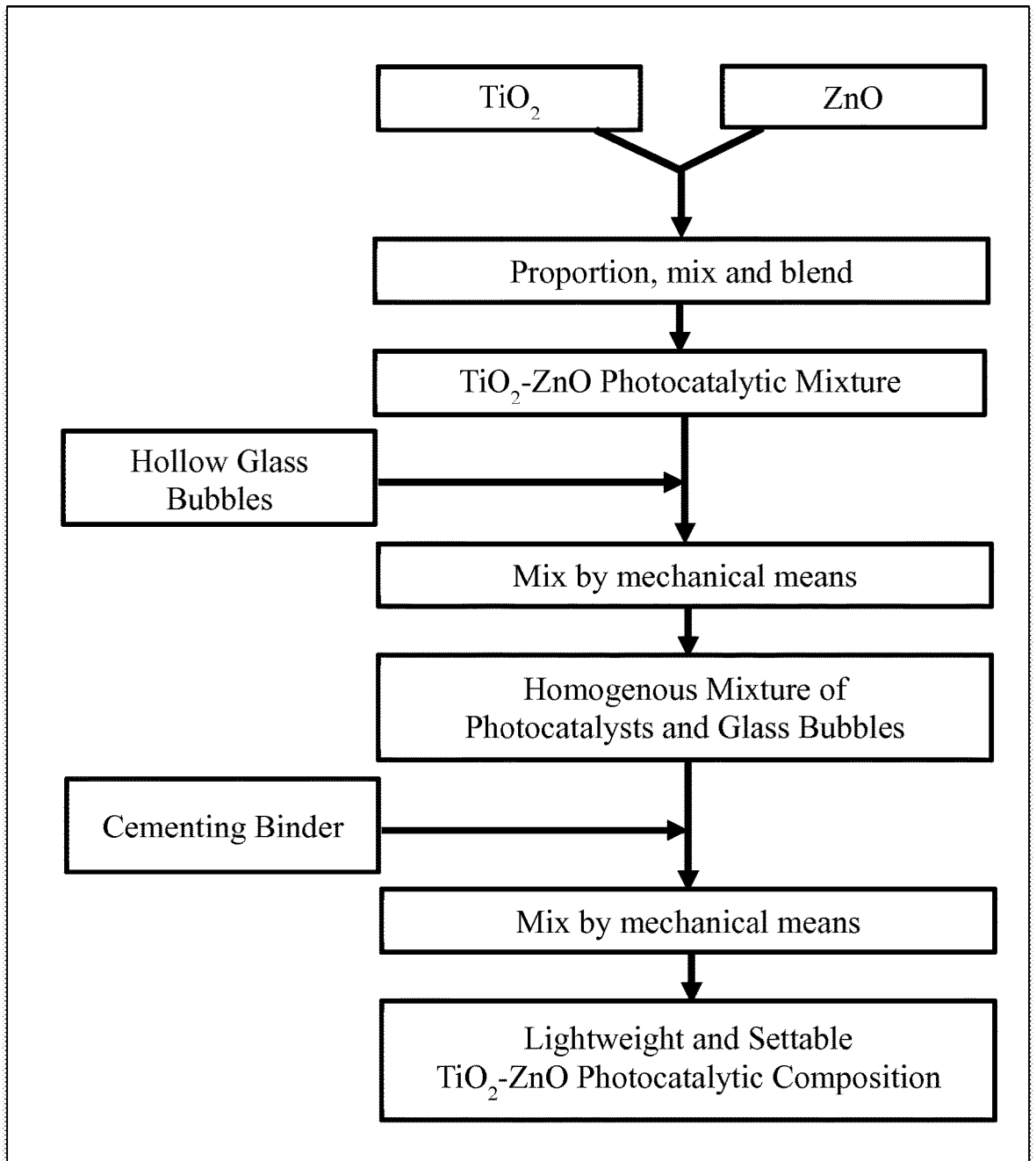
FIG. 1 shows a flow chart illustrating the separate steps for synthesizing the lightweight and settable $TiO_2$—$ZnO$ photocatalytic composition.

Lightweight and Settable Photocatalytic Composition: The invention also provides a method for preparing a light weight and settable photocatalytic composition, in which the proportions by weight of ZnO:$TiO_2$:glass bubbles:cementing binder, is for example in the ratio of 1:4:25:100. Various other photocatalysts and mixing ratios can be used as long as the composition retains its photocatalytic properties. In general, the photocatalytic activity increases with the type and amount of photocatalyst in the lightweight and settable photocatalytic composition. The method for preparing the lightweight and settable photocatalytic composition (FIG. 1) comprises proportioning, mixing and blending the photocatalysts in pre-determined ratios (if there are more than one photocatalyst, such as ZnO and $TiO_2$). This is followed by the addition of the pre-determined amount of lightweight glass bubbles, and mixing by mechanical means such as hand agitation or rolling in a horizontal ball mill, wherein the glass bubbles also act as tiny balls in the rotating ball mill, resulting in a homogeneous mixture of photocatalysts and glass bubbles. A predetermined amount of hydraulic cementing binder is added next and the mechanical mixing is continued for 5 to 10 minutes, until a homogenous lightweight and settable photocatalytic composition is formed (for example a lightweight and settable $TiO_2$—ZnO composition of the present invention).

Figure 2:
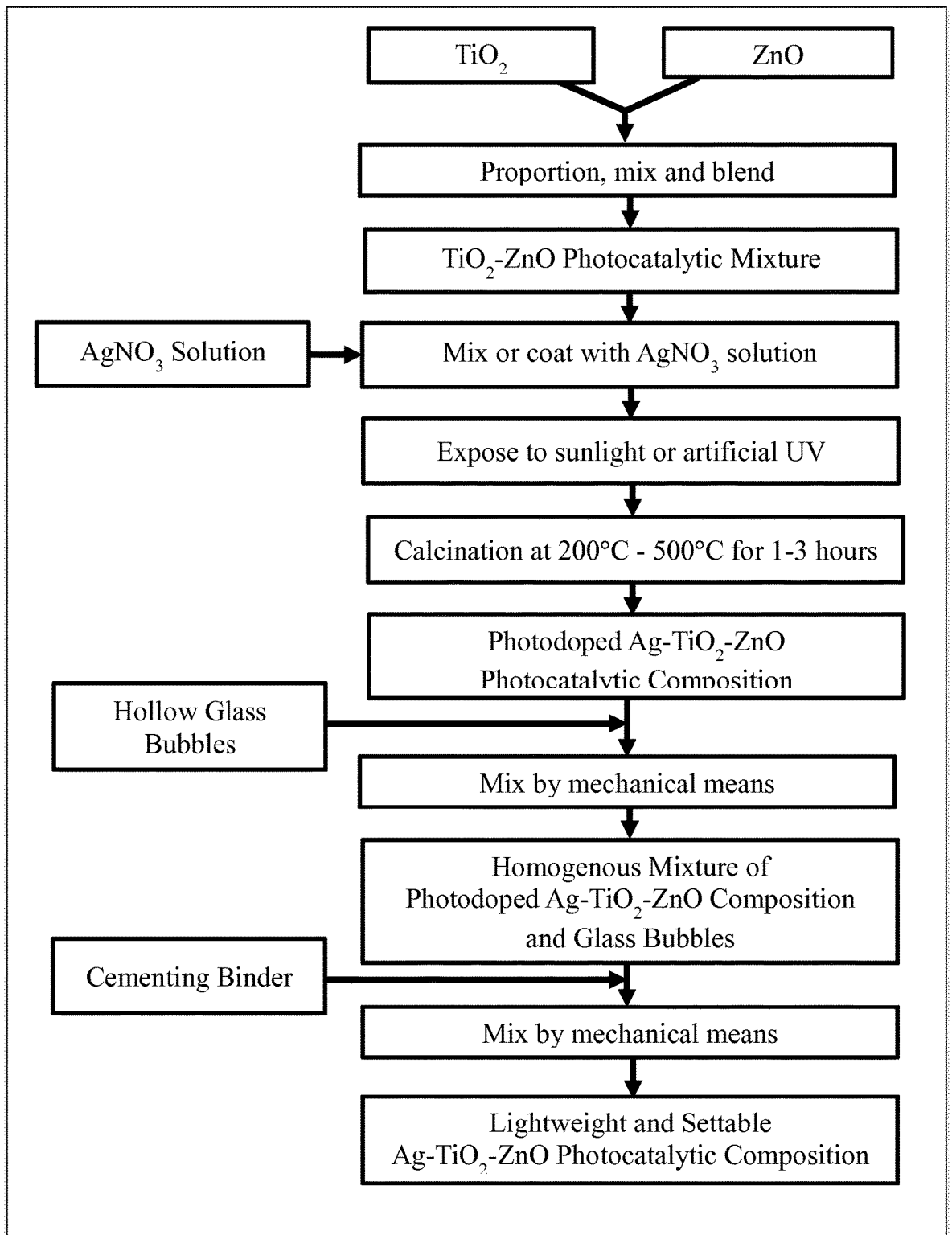
FIG. 2 shows a flow chart illustrating the separate steps for synthesizing the lightweight and settable Ag—$TiO_2$—$ZnO$ photocatalytic composition.

Doping $TiO_2$ with Ag is known to extend the photocatalytic range of $TiO_2$, from UV into the visible light spectrum. Ag is also a well-known bactericide that can aid in water purification. The inventor developed a relatively simple, fast, and cost effective methodology, to synthesize a novel lightweight and settable UV-Vis photocatalytic composition (Ag—$TiO_2$—ZnO) by photodoping the $TiO_2$—ZnO composition described earlier. The doping process of this invention (FIG. 2), referred to as photodoping, comprises mixing the photocatalysts and/or photocatalytic composition with a metal salt solution, such as 0.1M $AgNO_3$, and then exposing this to the sun. This is followed by calcining the Ag doped photocatalysts or photocatalytic composition at temperatures between 200° C. and 500° C. for a period of 1 to 3 hours. The lightweight and settable photocatalytic composition may further comprise additives or admixtures typically used in cement mortar or cement concrete for rapid hardening, improve workability, air entrainment, or color. The photodoping method described in this invention is fast, simple and cost effective compared to the time consuming and arduous sol-gel techniques reported in literature. Lightweight Photocatalytic Solid Composite: This lightweight and settable photocatalytic composition may be used as an additive for dry or wet mortar formulation. The photocatalytic composition may be mixed with water to form a paste for coating photocatalytically active surfaces, or for binding aggregates together in the production or manufacture of concrete. When water is added to the photocatalytic composition, it chemically reacts with the hydraulic binding material in a reaction known as hydration, resulting in a paste that sets and hardens with time. The hardening and strength gain with time requires moisture curing for a period of 7 to 28 days or even more, depending on the type of hydraulic cementing binder used in the formulation. After hardening, the photocatalysts are tightly bound to the solid photocatalytic composite, and do not wash-off after repeated use. The amount of water to be added is commonly referred as the "water-cementitious materials ratio" or simply as the "water-cement ratio". It is the ratio of the mass of water to mass of hydraulic cementing binder. The water-cement ratio to be used depends on the particular application and the desired properties of the hardened concrete; it is typically kept between 0.40 and 0.50 for engineering construction. High water-cement ratio results in low strength of hardened concrete. However, if the water-cement ratio is too low, the workability is reduced and it becomes difficult to mix, place and compact the fresh concrete. The inclusion of glass bubbles in the photocatalytic composition, improves the workability of mortar or fresh concrete, and thereby enables the use of low water-cement ratio (below 0.40) without impacting strength.

Figure 3:
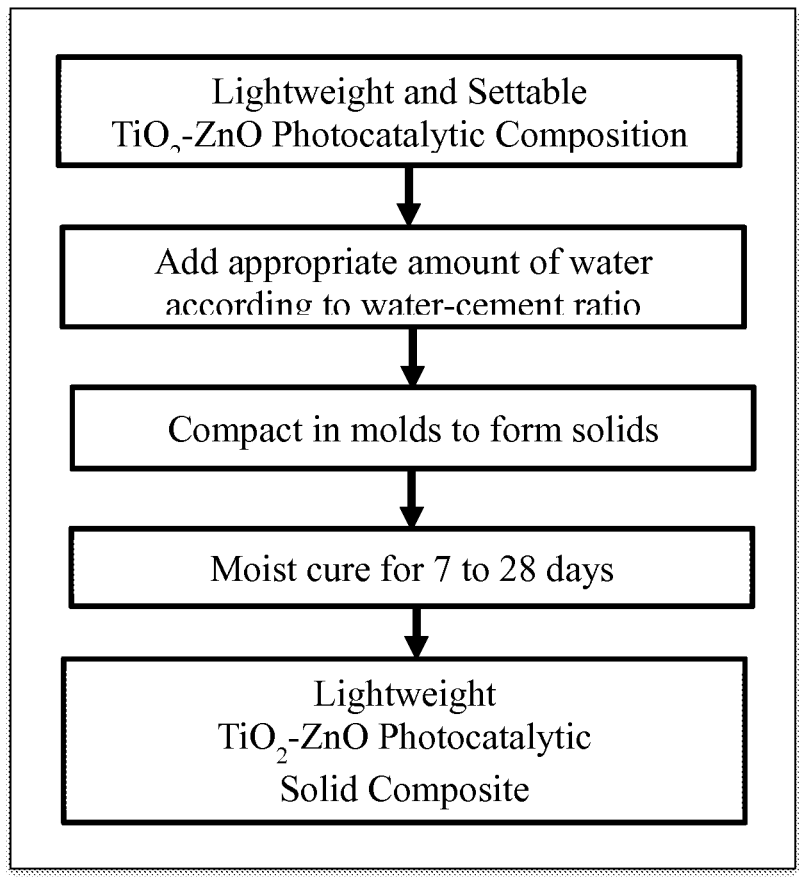
FIG. 3 shows a flow chart illustrating the separate steps for synthesizing the lightweight $TiO_2$—$ZnO$ photocatalytic solid composite.

To prepare the lightweight $TiO_2$—ZnO photocatalytic solid composites (FIG. 3), the lightweight and settable photocatalytic composition is mixed with water at the appropriate water-cement ratio (and optionally mixed with other aggregates such as sand and gravel). The resulting mix is placed and compacted in molds or of any desired shape or form (spherical, cubical, cylindrical etc.). The mixture is the allowed to set and harden with time. This time may vary from 7 to 28 days or even more, depending on the hydraulic cementing binder used. After setting and hardening a lightweight solid photocatalytic composite is formed. By increasing or decreasing the amount of the light weight (density 0.2 g/cc) glass bubbles in the composition, the lightweight solid photocatalytic composite could be made to float (composite density <1.0 g/cc), or sink (composite density >1.0 g/cc) in water.

Figure 4:
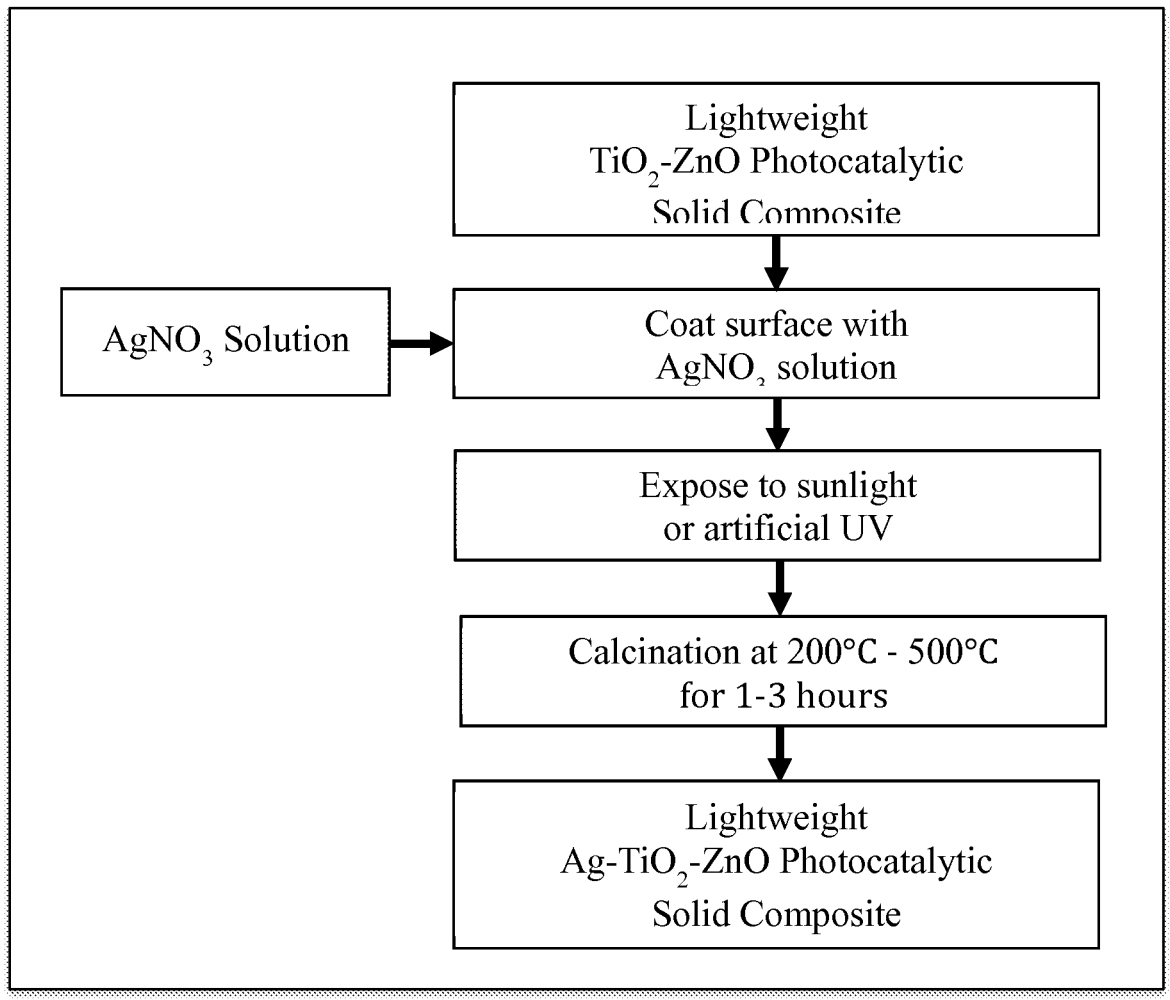
FIG. 4 shows a flow chart illustrating the separate steps for synthesizing the lightweight Ag—$TiO_2$—$ZnO$ photocatalytic solid composite.

The invention also provides a relatively simple, fast, and cost effective methodology, to synthesize lightweight, Ag—$TiO_2$—ZnO photocatalytic solid composites (FIG. 4) by surface-doping the lightweight $TiO_2$—ZnO photocatalytic solid composite (described earlier) with minute amounts of Ag (<1 wt %), only on the surface. The method for surface doping involves, spraying, brushing or coating by any other means the surface of the lightweight $TiO_2$—ZnO photocatalytic solid composites with a metal salt solution, such as 0.1M $AgNO_3$, and exposing it to the sun. The photocatalytic composite turns dark as Ag gets photoreduced onto the surface of the composite. The Ag doped composite is further calcined at temperatures between 200° C. and 500° C. for a period of 1 to 3 hours, to form the lightweight Ag—$TiO_2$—ZnO photocatalytic solid composite.

Figure 5:
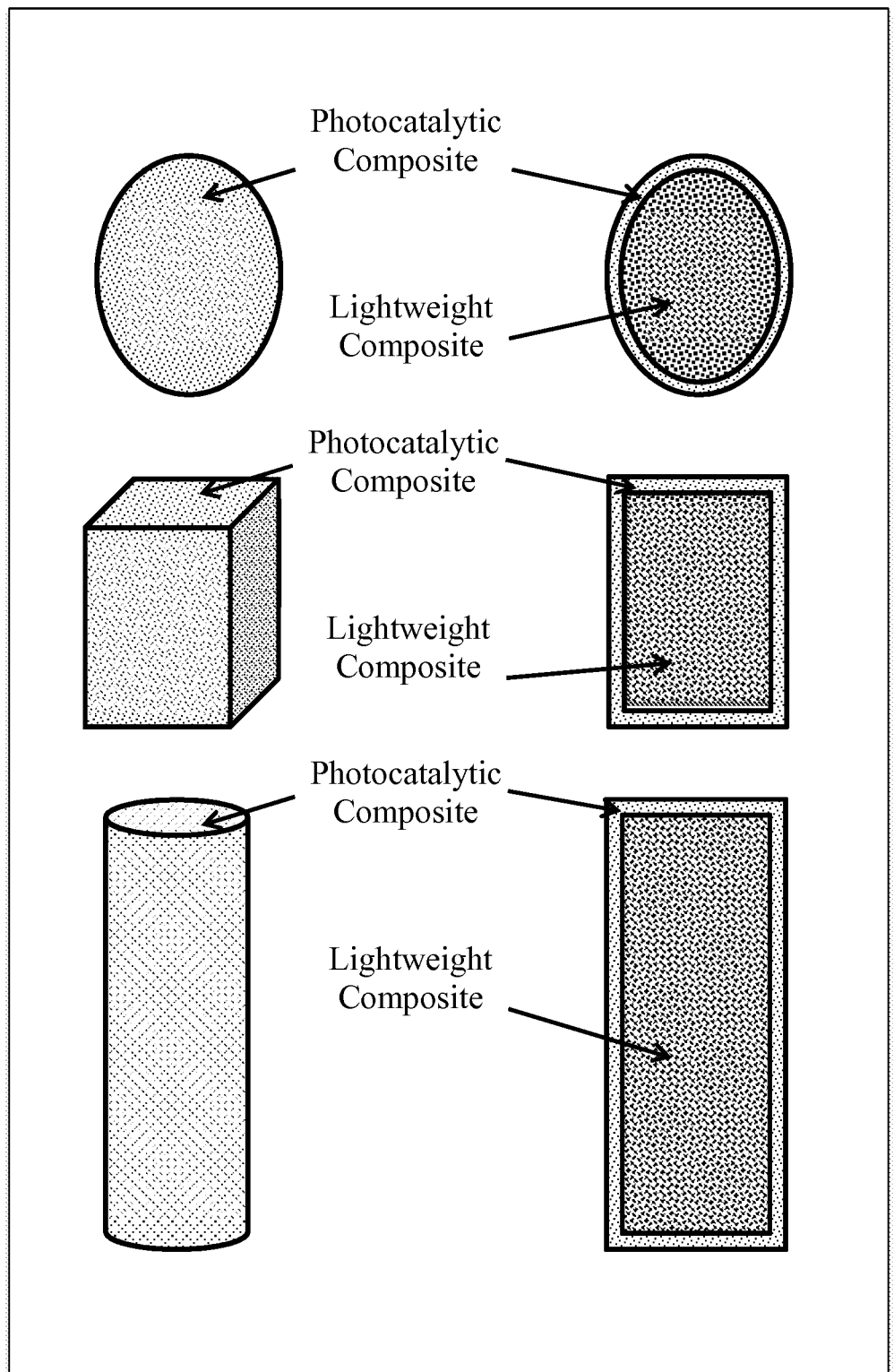
FIG. 5 is a perspective view of various substrates or solids that are coated with the lightweight and settable photocatalytic composition.
Figure 6:
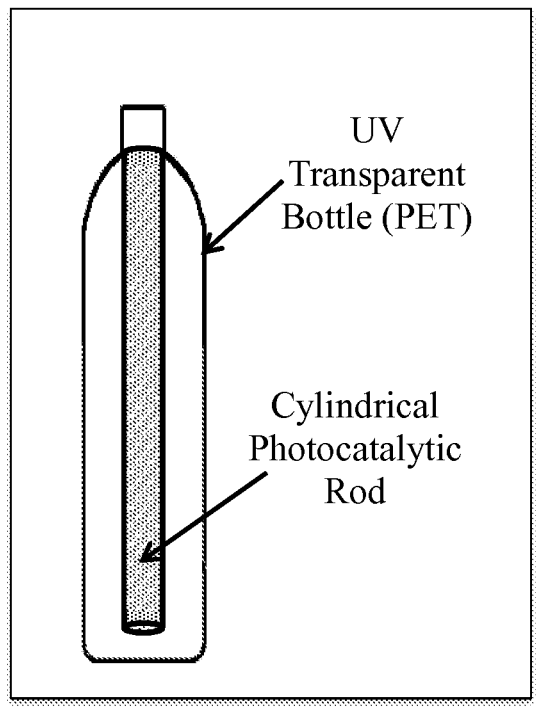
FIG. 6 is a side view of cylindrical photocatalytic rod made with the lightweight and settable photocatalytic composition, immersed in water inside a PET water bottle.

Applications:

The lightweight photocatalytic solid composites developed in this research can be easily deployed in several different ways to avoid the drawbacks of conventional $TiO_2$ enhanced SODIS methods (namely the blocking of UV rays and washing off after repeated use). In one embodiment, various substrates or solids can be coated with the lightweight and settable photocatalytic compositions (FIG. 5) and may be placed in contact with contaminated water in vessels or containers that are transparent to UV and visible light (such as PET water bottles), and exposed to sunlight or artificial, until the contaminated water is purified (FIG. 6).

Figure 7:
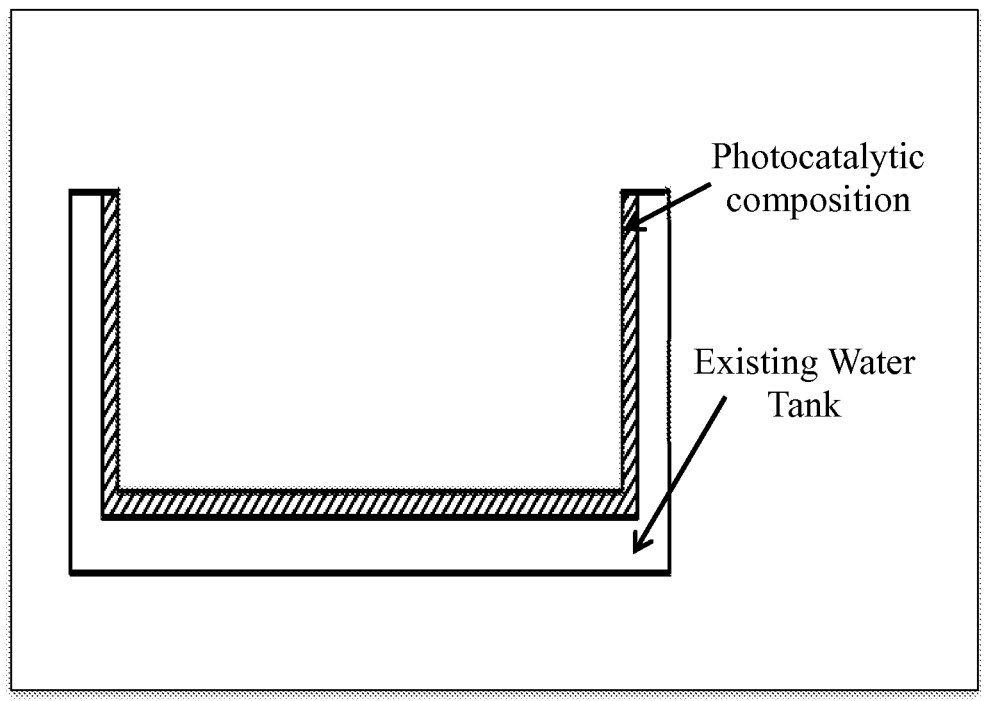
FIG. 7 illustrates the schematics of a water tank coated with the lightweight and settable photocatalytic composition.
Figure 8:
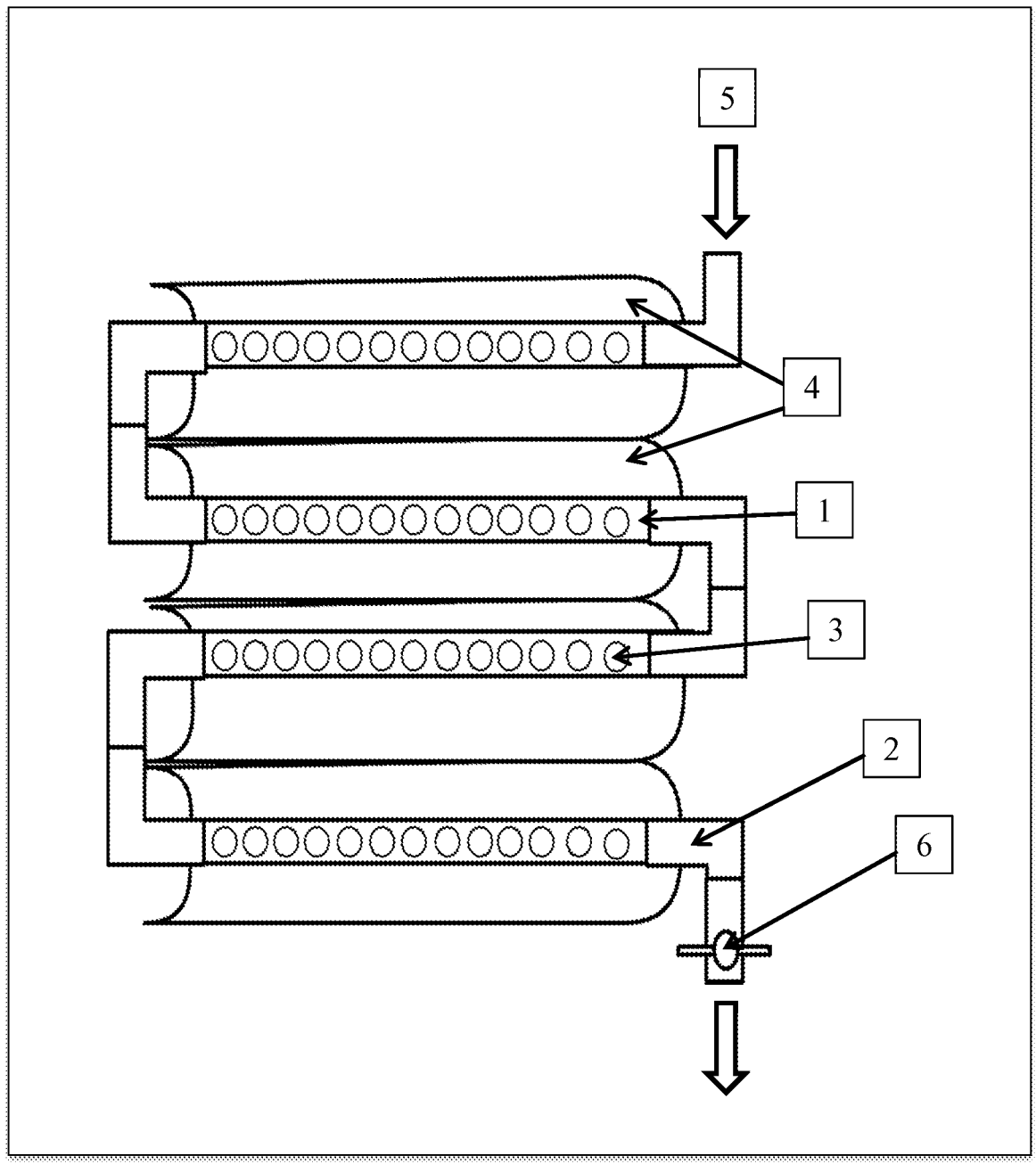
FIG. 8 is a perspective view of a water purification panel made using the lightweight photocatalytic composite spheres placed in UV and visible light transparent tubes, and parabolic trough reflectors to concentrate sunlight on the photocatalytic composite.

In another embodiment, lightweight photocatalytic concrete water tanks may be constructed with the lightweight and settable photocatalytic composition mixed with concrete, or existing water tanks can be coated with the lightweight and settable photocatalytic composition (FIG. 7). Contaminated water may then be treated in the photocatalytic tanks by exposure to sunlight (or artificial light) to purify water, before use, or even before being discharged to lakes, streams, rivers and other water bodies. This could reduce the use of harsh chemicals for treating water. In yet another embodiment, the lightweight photocatalytic solid composite may be deployed in a continuous or semi-continuous water purification system that could be built as a small residential point-of-use system, or built on a larger scale for batch water purification (FIG. 8). A photocatalytic water purification panel is constructed out of UV and visible light transparent tubes 1 such as Polyethylene terephthalate glycol-modified (PETG), acrylic, glass, or any other tubes that are transparent to UV and visible light. The tubes may be interconnected in series using elbows and connectors 2. The lightweight photocatalytic solid composites 3—(spheres, cubes, cylinders or of any size, shape or form) are placed in the tubes; parabolic trough reflectors 4 made of solar reflector film may be used to concentrate sunlight on the photocatalytic composite contained in the tubes. The tubes are filled with contaminated water through the inlet 5 and are exposed to sunlight until the water is purified by photocatalysis. The water purification panel can be built large enough to treat water in a batch process. The water purification panel may be filled with a new batch of contaminated water and the purification process can be continued. For a continuous flow water purification system, the flow rate can be reduced by a flow control valve 6 so that water remains in the system for a sufficient amount of time, until purified.

EXAMPLES

Materials: The raw materials used in synthesizing the photocatalytic composites were commercially available Portland cement, K20 glass bubbles having soda-lime-borosilicate glass composition from 3M Center, $TiO_2$ Degussa (P-25) with 80% anatase and 20% rutile crystal structure, ZnO and $AgNO_3$ from Fisher Scientific. The synthesized photocatalytic composites were characterized by scanning electron microscopy (SEM) and energy-dispersive X-ray spectroscopy (EDS) using a field-emission scanning electron microscope. Enterobacteriaceae and aerobic bacteria counts were determined using 3M Petrifilms. 3M Solar Mirror Film-1100 was used in the fabrication of the prototype photocatalytic water purification panel.

Figure 9A:
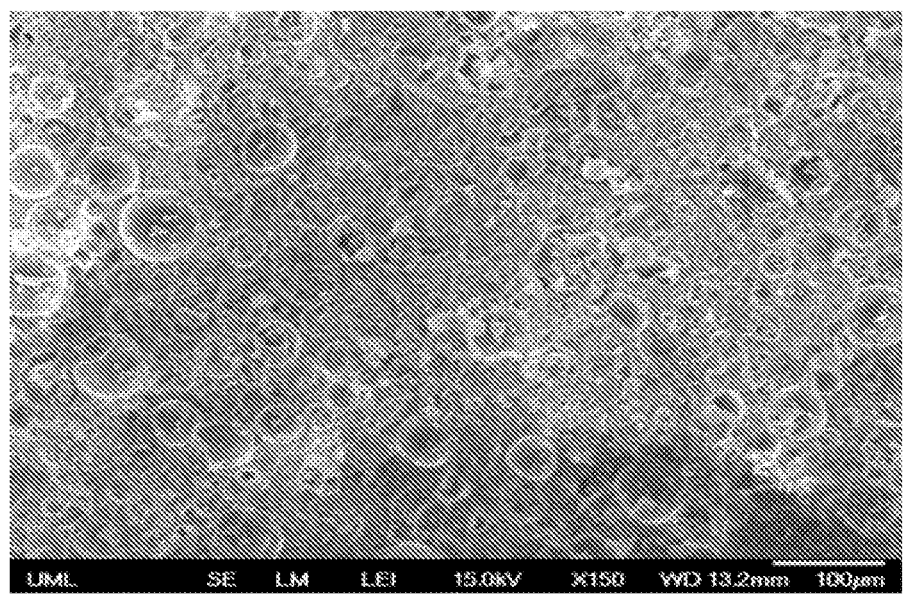
FIG. 9A displays the SEM and FIG. 9B displays the EDS results for the lightweight $TiO_2$—$ZnO$ photocatalytic solid composite.
Figure 9B:
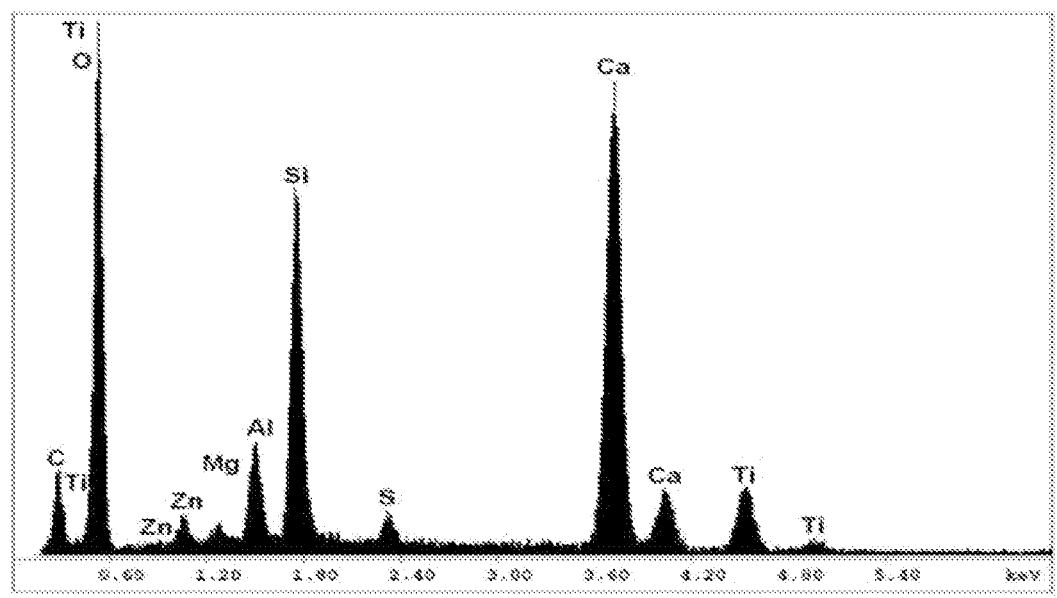
Figure 10A:
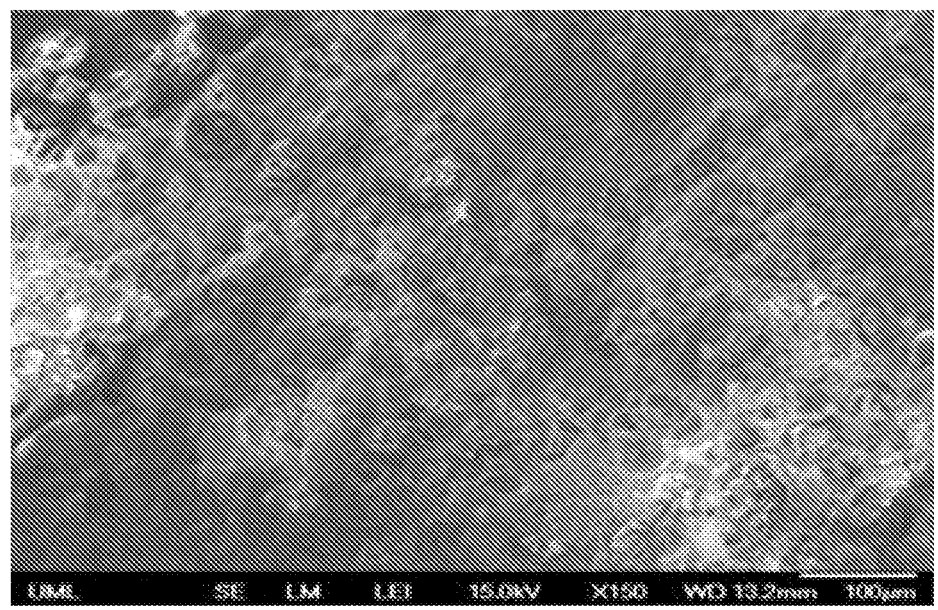
FIG. 10A displays the SEM and FIG. 10B displays the EDS results for the lightweight Ag—$TiO_2$—$ZnO$ photocatalytic solid composite.
Figure 10B:
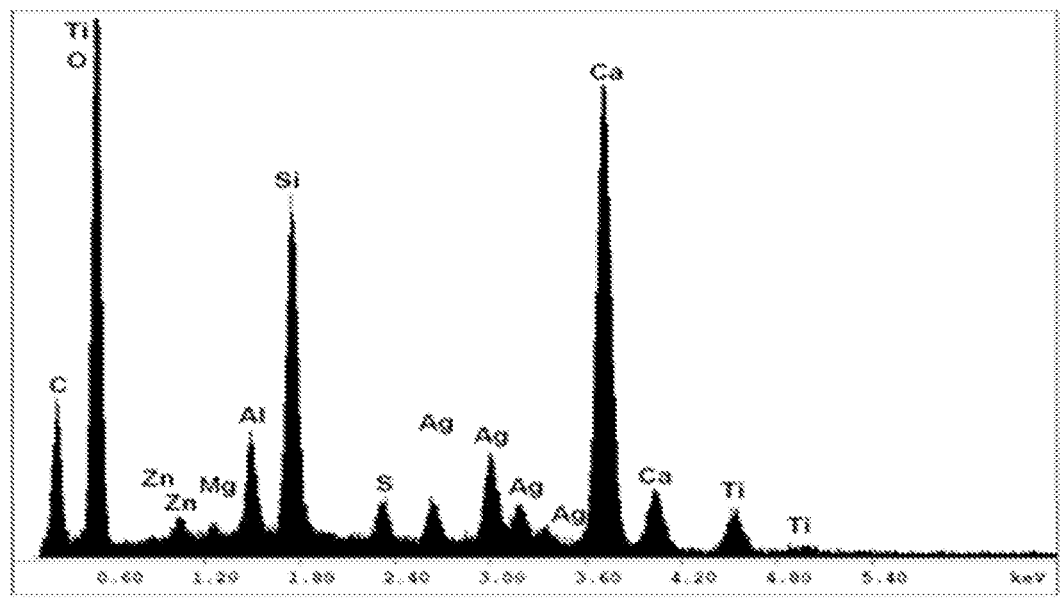

A lightweight and settable photocatalytic composition was prepared using two photocatalysts ($TiO_2$ and ZnO), glass bubbles, and rapid hardening Portland cement as described earlier. A ratio of 1:4:25:100 was used for ZnO:$TiO_2$:glass bubbles:cement. Water was added to the photocatalytic composition, at a water cement ratio of 0.3 and mixed using a mechanical stirrer. The moist composition was formed into 17 mm diameter spheres and moist cured for 7 days. After setting and hardening of the resulting mixture, the photocatalysts were tightly bound to the lightweight $TiO_2$—ZnO solid composite spheres. The lightweight Ag—$TiO_2$—ZnO solid composite spheres were formed by spray coating the lightweight $TiO_2$—ZnO composite spheres with 0.1M $AgNO_3$ solution prepared in distilled water. The Ag—$TiO_2$—ZnO photocatalytic spheres were then exposed to sunlight for one hour. The $TiO_2$—ZnO spheres turned dark in just minutes. This change in color occurred as Ag was reduced onto the surface of the $TiO_2$—ZnO photocatalytic spheres. The Ag doped composite was then calcined at a temperature of 300° C. for three hours. Characterization of the lightweight photocatalytic solid composites: SEM and EDS results for the lightweight $TiO_2$—ZnO and Ag—$TiO_2$—ZnO photocatalytic solid composites are shown in FIGS. 9 and 10. The SEM results of the TiO$_2$—ZnO composite (FIG. 9A) clearly show the glass bubbles embedded in the matrix of cement, TiO$_2$ and ZnO. The peaks in the EDS results (FIG. 9B) clearly show the presence of Ti, Zn, 0 and various elements that are part of the lightweight and settable composition of Portland cement and the glass bubbles. Due to significant contrast, the presence of Ag can be clearly seen as dark shades in the SEM image of the Ag—TiO$_2$—ZnO composite (FIG. 10A). The elemental composition by EDS confirmed the presence of Ag in the Ag—TiO$_2$—ZnO composite (FIG. 10B).

Exposure studies to evaluate bacterial inactivation: The water used for testing was obtained just after the secondary treatment, but before the addition of sodium hypochlorite (that kills harmful bacteria) from a wastewater treatment facility. Three 100 mL samples were taken in glass beakers. A TiO$_2$—ZnO sphere was placed in one of the sample beakers, an Ag—TiO$_2$—ZnO sphere was placed in the second sample beaker, and a control containing only the test water sample was placed in the third sample beaker. The photocatalytic bactericidal properties of the TiO$_2$—ZnO and Ag—TiO$_2$—ZnO lightweight composites were evaluated under various exposure conditions: sunlight (outside), visible light (inside a room), and in the dark (in a dark room). Enterobacteriaceae counts (EBC) and aerobic bacteria counts (ABC) were determined with 3M Petrifilms after 0 h, 1 h, 2 h, 4 h, 6 h and 8 h. The petrifilms were plated (inoculated) with 1 mL of water sample. Ten-fold serial dilutions were performed for samples with high concentrations of bacteria. The plates were incubated for 48 hours at 34° C. for the ABC, and 24 hours at 34° C. for the EBC. The colonies were then manually counted.

FIG. 11 shows the average number of EBC at various time intervals for the three test samples (control, TiO$_2$—ZnO, Ag—TiO$_2$—ZnO) exposed to sunlight, visible light and in the dark. The tests were all done in triplicate. The EBC for the samples exposed to sunlight (FIG. 11A) dropped from initial average values of 197 to 0 cfu/mL in one hour for the Ag—TiO$_2$—ZnO composite, 187 to 0 cfu/mL in four hours for the TiO$_2$—ZnO composite and 207 to 0 cfu/mL in eight hours for the control (plain SODIS) sample. The EBC for the samples exposed to visible light (FIG. 11B) dropped from initial average values of 190 to 0 cfu/mL in four hours for the Ag—TiO$_2$—ZnO composite, 210 to 193 cfu/mL for the TiO$_2$—ZnO composite and 170 to 163 cfu/mL for the control, both in eight hours. The EBC for the sample with the Ag—TiO$_2$—ZnO composite kept in the dark, dropped from an initial average value of 193 to 0 cfu/mL in eight hours (inactivated bacteria even in the dark), whereas the TiO$_2$—ZnO composite and the control showed no appreciable change (<10%) in the EBC (FIG. 11C). FIG. 12 shows the average number of ABC at various time intervals for the three test samples exposed to sunlight, visible light and in the dark. The ABC for the samples exposed to sunlight (FIG. 12A) dropped from initial average values of 3767 to 0 cfu/mL in one hour for the Ag—TiO$_2$—ZnO composite, 4200 to 173 cfu/mL in eight hours for the TiO$_2$—ZnO composite and 3967 to 187 cfu/mL in eight hours for the control sample. The ABC for the samples exposed to visible light (FIG. 12B) dropped from initial average values of 4067 to 0 cfu/mL in eight hours for the Ag—TiO$_2$—ZnO composite, 3933 to 3567 cfu/mL and 3967 to 3767 cfu/mL for the TiO$_2$—ZnO composite and control respectively, both in eight hours. The ABC for the sample with the Ag—TiO$_2$—ZnO composite kept in the dark, dropped from an initial average value of 3900 to 287 cfu/mL in eight hours (worked even in the dark), whereas the TiO$_2$—ZnO composite and the control showed no appreciable change (<10%) in the ABC (FIG. 12C).

The TiO$_2$—ZnO composite exposed to sunlight showed 100% inactivation of Enterobacteriaceae in 4 hours, and 96% inactivation of aerobic bacteria in 8 hours. The bacterial inactivation by the TiO$_2$—ZnO composite was primarily due to UV-A activated photocatalysis as shown by its efficacy in destroying bacteria when exposed to sunlight. There was no significant bacterial inactivation when exposed to visible light or in the dark (<10%). The Ag—TiO$_2$—ZnO composite showed 100% inactivation of Enterobacteriaceae and aerobic bacteria in 1 hour. Under visible light, the Ag—TiO$_2$—ZnO composite showed 100% inactivation of Enterobacteriaceae in 4 hours and 100% inactivation of aerobic bacteria in 8 hours, whereas the TiO$_2$—ZnO and control showed no appreciable (<10%) bacterial inactivation. Even for tests performed in the dark, 100% inactivation of Enterobacteriaceae was achieved in 8 hours, and 93% aerobic bacterial inactivation in 8 hours, whereas the TiO$_2$—ZnO and control showed no appreciable bacterial inactivation (<5%). The control (plain SODIS) showed 100% and 95% inactivation of Enterobacteriaceae and aerobic bacteria respectively, when exposed to UV-A; however, it took 8 hours to achieve this disinfection.

The photo-killing property of the lightweight TiO$_2$—ZnO composite is primarily due to the reactive oxygen species (hydroxyl radical, super oxides and hydrogen peroxide) that are generated as a result of UV-A activated photocatalysis (FIG. 13) and its interaction with the cell structure and DNA of bacteria. In the lightweight Ag—TiO$_2$—ZnO composite, the photocatalytic activity is greatly improved resulting in the formation of more reactive oxygen species (FIG. 14). The bactericidal potency of the lightweight Ag—TiO$_2$—ZnO composite was the greatest when exposed to sunlight, followed by visible light and finally in the dark. The synergistic effects of UV-Vis photocatalysis due to the lowering of band-gap energy, inhibition of electron-hole recombination, and the inherent antimicrobial properties of Ag enhanced the bactericidal potency of the novel Ag—TiO$_2$—ZnO composite. Thus, the novel Ag—TiO$_2$—ZnO lightweight composite can be used to purify water round-the-clock.

The invention claimed is:
1. A water purification system, comprising
  one or more tubes positioned in front of a light source and optionally interconnected in a series with elbow shaped tube connectors; and
  one or more parabolic trough reflectors positioned behind the one or more tubes such that the light is focused on the tubes;
  wherein
    the tubes contain one or more solid compositions;
    each solid composition comprises one or more photocatalysts selected from the group consisting of TiO$_2$, ZnO, WO$_3$, Cu$_2$O, SnO$_2$, SiO$_2$, RuO$_2$, SrTiO$_3$, Fe$_2$O$_3$, NiO, and SiC; one or more soda-lime-borosilicate glass bubbles; and hydraulic cement, wherein the one or more photocatalysts and soda-lime-borosilicate glass bubbles are in a homogenous mixture;
    the first tube has an inlet for the entry of water; and
    the last tube has an outlet for the exit of water, where the outlet optionally has a valve to control water flow.
2. The system of claim 1, wherein the tubes are transparent to UV and visible light and comprise polyethylene terephthalate glycol-modified, acrylic or glass.

3. The system of claim 1, wherein each tube contains one or more solid compositions shaped as spheres, cubes, or cylinders that are positioned throughout the length of the tube.

4. The system of claim 1, wherein the photocatalyst is $TiO_2$, ZnO, or a mixture of both.

5. The system of claim 1, wherein each solid composition further comprises one or more metals and non-metals selected from the group consisting of N, C, S, P, B, F, I, Cu, Ag, Pt, Pd, Mn, W, Ni, Sn, Fe, and V.

6. The system of claim 5, wherein the photocatalyst is a complex comprising Ag, $TiO_2$, and ZnO.

7. The system of claim 5, wherein each solid composition comprises a metal; the metal is Ag; and the metal coats the surface of the composition.

8. The system of claim 1, wherein the glass bubbles are hollow and transparent to UV and visible light.

9. The system of claim 1, wherein the photocatalyst is a mixture of ZnO and $TiO_2$, and the proportions by weight of ZnO:$TiO_2$:soda-lime-borosilicate glass bubbles:hydraulic cement is in the ratio of 1:4:25:100.

* * * * *